United States Patent [19]

Grassi et al.

[11] Patent Number: 5,254,295
[45] Date of Patent: Oct. 19, 1993

[54] METHOD FOR FORMING REINFORCED POWDER PARTICLES

[75] Inventors: John A. Grassi, Princeville; M. Brad Beardsley, Laura, both of Ill.

[73] Assignee: Caterpillar Inc., Peoria, Ill.

[21] Appl. No.: 985,716

[22] Filed: Dec. 4, 1992

[51] Int. Cl.$^5$ .............................................. B29B 9/10
[52] U.S. Cl. ...................................... 264/14; 264/12
[58] Field of Search ................ 264/8, 12, 14; 75/333, 75/338, 341

[56] References Cited

U.S. PATENT DOCUMENTS

| | | | |
|---|---|---|---|
| 4,361,624 | 11/1982 | Spivack | 428/398 |
| 4,638,029 | 1/1987 | Meschke et al. | 524/430 |
| 4,867,931 | 9/1989 | Cochran, Jr. | 264/9 |
| 4,981,511 | 1/1991 | Schmidberger et al. | 75/229 |
| 5,080,977 | 1/1992 | Zaplatynsky | 428/432 |
| 5,171,489 | 12/1992 | Hirao et al. | 264/8 |

OTHER PUBLICATIONS

Article entitled "Process Requirements for Plasma Sprayed Coatings for Internal Combustion Engine Components" by W. f. Calosso and A. R. Nicoll (from The American Society of Mechanical Engineers—1987).

*Primary Examiner*—Mary Lynn Theisen
*Attorney, Agent, or Firm*—Robert A. McFall

[57] ABSTRACT

A flowable slurry comprising powder matrix particles and reinforcing particles is pumped, under pressure, through an atomizing nozzle to form discrete droplets containing reinforcing particles coated with the powder matrix particles The discrete droplets are suspended in an elevated temperature environment for a sufficient time to evaporate the water from the droplets and form nonreacted reinforced powder particles. The reinforced powder particles are nonagglomerated and are suitable for immediate use as powder for thermal spray coatings or for dry processed compacted structural components.

6 Claims, 1 Drawing Sheet

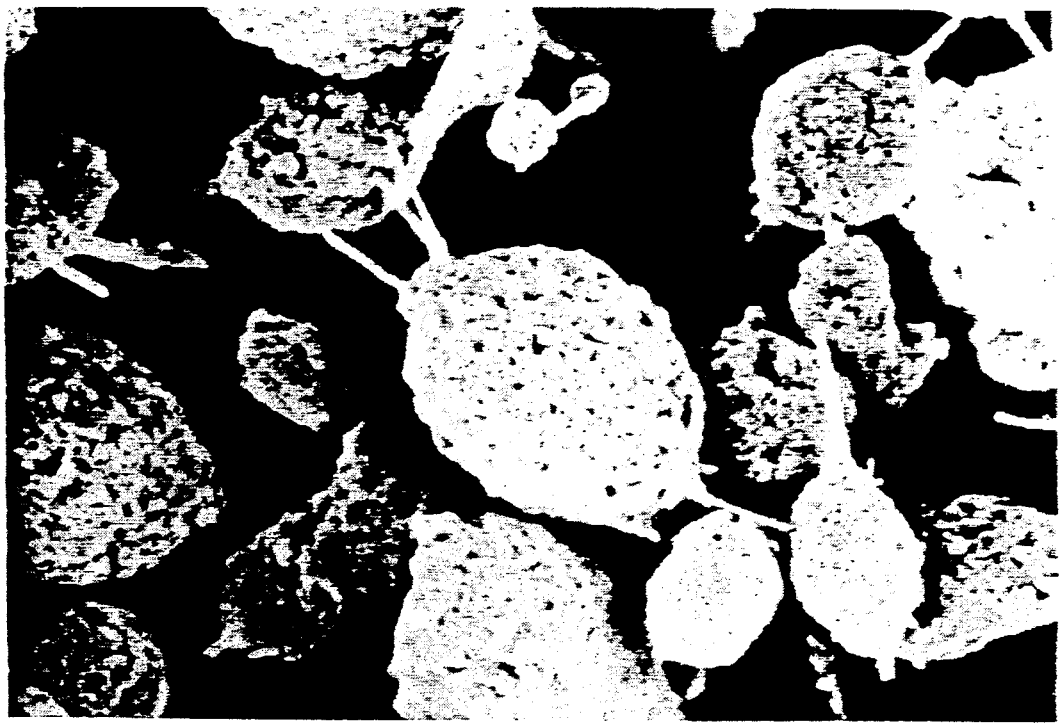

METHOD FOR FORMING REINFORCED POWDER PARTICLES

TECHNICAL FIELD

This invention relates generally to a method for forming reinforced powder particles, and more particularly to a method for forming reinforced powder particles by spray drying atomized droplets containing coated reinforcement particles.

BACKGROUND ART

Many ceramic and metallic materials exhibit increased strength, and often toughness, when reinforced with a second phase in the form of fibers, whiskers or particulates. However, the processing required to uniformly disperse the reinforcing phase within the matrix material is often cumbersome and ineffective. For example, U.S. Pat. 5,080,977, issued Jan. 14, 1992, to Isidor Zaplatynsky describes two methods of forming composite powder materials. In the first method, ceramic and glass powders are mixed together and sintered at 1400° C. for 10 to 15 hours. The sintered material is then crushed to obtain a composite powder having a particle size suitable for plasma spray deposition. In the second method, a sol-gel paste mixture comprising ceramic particles coated with gel (the precursor of a glass phase) is heated and dried to form an intermediate agglomerate The agglomerate is then heated to 1300° C. and held at that temperature for several hours, after which the material is comminuted by crushing.

Such methods of forming coated particles are inherently time-consuming and costly and, if the respective powders are not uniformly dispersed prior to sintering, are prone to segregation defects. Furthermore, as a result of the required comminution after sintering, the size and shape of the particles is compromised For example, composite materials having fibers or other elongate reinforcement components, such as ceramic whiskers, cannot be formed by the above described methods because crushing would break the fibers.

The present invention is directed to overcoming the problems set forth above. It is desirable to have an economical method for coating the reinforcement component of composite materials with the matrix component so that segregation of the components is avoided during subsequent deposition or dry forming. It is also desirable to have such a method that is substantially nonreactive and does not damage or otherwise alter the structural shape of the reinforcement component.

DISCLOSURE OF THE INVENTION

In accordance with one aspect of the present invention, a method for forming reinforced powder particles includes forming a flowable slurry comprising powder matrix particles and reinforcing particles, pressurizing the slurry, and discharging the pressurized slurry from an atomizing nozzle. Upon discharge from the atomizing nozzle, discrete droplets are formed containing the reinforcing particles coated with the powder matrix particles The droplets are suspended in an elevated temperature environment for a length of time sufficient to drive off substantially all free moisture from the droplets.

BRIEF DESCRIPTION OF THE DRAWING

The single drawing is a photomicrograph at about 1560× showing reinforcement particles coated with powder matrix particles according to the method embodying the present invention.

BEST MODE FOR CARRYING OUT THE INVENTION

The reinforced powder particles formed by the method embodying the present invention comprise matrix particles bonded to a reinforcement particle and are particularly suitable, without any further processing, as powder stock for thermally sprayed coatings or for dry processing, i.e, pressing, into monolithic structural components. Reinforced powder particle representative of the reinforced powder particles formed in accordance with the present invention are shown in the photomicrograph comprising the sole drawing figure. Significantly, the matrix material, comprising the large, light colored globular structures in the photomicrograph, surrounds and encapsulates a portion of each of the thin elongate whisker reinforcement members. Desirably, the reinforcement members extend outwardly from the matrix material, a characteristic which is beneficial to promoting an interlocking structure in subsequent compaction or deposition of the reinforced powder particles.

In the preferred embodiment of the present invention, the method includes initially forming a slurry containing powder matrix particles and reinforcement particles The matrix particle component of the slurry may comprise alumina, zirconia, or other ceramic or metallic material suitable as the matrix component of composite materials. The reinforcement particles may be selected from the group that includes silicon carbide whiskers, zirconia fibers, aluminum oxide fibers, tungsten carbide, or other ceramic or metallic materials that may provide improved physical properties to composite materials.

Significantly, the process embodying the present invention is carried out in an air environment at temperatures below which the any reaction products of the constituent components, either with air or with each other, are formed.

In an illustrative example of the present invention, ceramic/ceramic matrix (CCM) powder particles are formed having silicon carbide whisker ($SiC_w$) particles coated with a plurality of aluminum oxide ($Al_2O_3$) powder matrix particles. Prior to adding any liquid components, 485.1 g of aluminum oxide powder (the matrix particles) are blended with 6.2 g of magnesium oxide (MgO) powder. The aluminum oxide matrix powder preferably comprises about 100 g of very fine powder particles having a nominal particle size of less than 0.5 $\mu$m with the balance of the aluminum oxide particles having a nominal particle size of about 3 $\mu$m. The magnesium oxide powder preferably has a nominal particle size of about 5 $\mu$m. The relatively small amount of MgO is optionally included as a processing aid if it is desired to subsequently use the reinforced particles in dry processing applications e.g., if the coated particles are later pressed and sintered to form a monolithic structural member.

Water, in an amount of 420.5 g, along with 0.4 g of a 90% ammonia napthalene sulfonate solution (a dispersant), and 70.8 g of silicon carbide whiskers ($SiC_w$) are mixed into the above described powder blend to form a flowable aqueous slurry containing the aluminum oxide powder matrix and the silicon carbide whisker reinforcing particles In the illustrative example, the silicon carbide whiskers have a length of about 70 μm to 90 μm and diameter of about 3 μm.

After the above aqueous slurry is thoroughly mixed, 60.3 g of a 5.8% solution of polyvinyl alcohol is preferably added as a bond promoter to enhance adherence of the $Al_2O_3$ powder matrix particles to the larger $SiC_w$ reinforcing particles. After thorough mixing of the slurry, it is desirable to add a very small amount of an anti-foaming agent prior to final mixing. In the illustrative example, 3 drops of tri-n-butyl phosphate is added for this purpose.

The above described flowable aqueous slurry is then forced, under pressure, through an atomizing nozzle to form discrete droplets containing the $SiC_w$ reinforcing particles coated with the smaller $Al_2O_3$ powder matrix particles. Preferably, the slurry is pumped, via a peristaltic pump, from the mixing container to a rotary atomizer of a spray dryer.

In carrying out the herein described example illustrative of the preferred embodiment of the present invention, a commercial spray dryer having an evaporative capacity of 7.0 Kg of $H_2O$ per hour at 350° C. and having a side-cast rotary atomizing nozzle, was used to form and dry the discrete droplets containing the coated reinforcing particles. The spray dryer was heated to a temperature of about 300° C., and maintained at that temperature as the slurry was pumped through the rotary atomizing nozzle at a rate of about 200 g/min. At this temperature and processing rate, the atomized discrete droplets were suspended in the heated chamber of the spray dryer for a time sufficient to evaporate substantially all of the free moisture from the discrete droplets.

It is important that the drying temperature, i.e., the temperature at which free moisture is evaporated, be maintained below the temperature at which any reaction products, such as oxides, of the respective components are formed. Desirably, with the above described ceramic materials, the evaporative step is carried out at a temperature of less than about 500° C. to assure that there is no reaction of the ceramic components with the air atmosphere Upon collection from the spray dryer, the coated reinforcing particles were separate, nonagglomerated, free flowing powder particles suitable for direct use in thermal spray or dry processing applications. Also, as shown in the photomicrograph, the ends of the silicon carbide whisker reinforcement particle protrude outwardly beyond the aluminum oxide matrix powder particles which are centrally disposed on the whisker. This characteristic advantageously enables the reinforced particles to anchor with the matrix component of adjacently disposed particles in any later formed coating or compacted monolithic structure.

INDUSTRIAL APPLICABILITY

The method of forming reinforced powder particles embodying the present invention is economical because it is carried out at a relatively low temperature and does not require sintering, reaction, pressing or subsequent comminution of the reinforced particles. In addition, segregation of the matrix and reinforcement components often found in dry-blended composite materials, is avoided.

Furthermore, the reinforced particles produced by the method embodying the present invention have highly desirable morphological characteristics because pulverizing, or comminution, or an agglomerated mass is avoided by the present process. Consequently, powder particles having fiber, whisker, or other elongate or irregular shaped reinforcement components of the particle are formed without damage, breakage, or other compromise to the size, shape, and surface characteristics of the reinforcement component.

An additional advantage of the present method of forming reinforced powder particles is that the constituent matrix and reinforcement components can be separately selected to provide optimized physical properties, such as tensile strength, hardness, wear, and ductility. Heretofore, the selection of the constituent components was limited because of reactions that may occur during process steps carried out at very high temperatures, such as sintering or reaction with an oxidizing or reducing atmosphere. Such reactions often limited the subsequent uses of the reinforced powder particles.

Other aspects, features and advantages of the present invention can be obtained from a study of this disclosure together with the appended claims.

We claim:

1. A method of forming solid reinforced powder particles, consisting essentially of:
   forming a flowable slurry comprising powder matrix particles and reinforcing particles;
   pressurizing said slurry;
   discharging said pressurized slurry from an atomizing nozzle;
   forming a plurality of discrete droplets containing said reinforcing particles coated with said powder matrix particles; and,
   suspending said atomized discrete droplets in said heated air temperature environment for a time sufficient to evaporate substantially all free moisture from said discrete droplets, said heated air temperature environment comprising air heated to a temperature of less than about 500° C.

2. A method of forming reinforced powder particles, as set forth in claim 1, wherein said powder matrix particles and said reinforcing particles each have a predetermined nominal size, the nominal size of said powder matrix particles being substantially smaller than the nominal size of said reinforcing particles.

3. A method of forming reinforced powder particles, as set forth in claim 1, wherein said powder matrix particles and said reinforcing particles comprise ceramic materials that are substantially nonreactive with air at a temperature of less than about 500° C.

4. A method of forming reinforced powder particles, as set forth in claim 1, wherein said slurry comprises an aqueous solution of ceramic matrix powder particles, ceramic reinforcing particles and a binder.

5. A method of forming reinforced powder particles, as set forth in claim 4, wherein said powder matrix particles are aluminum oxide powder, said reinforcing particles are silicon carbide whiskers, and said binder is polyvinyl alcohol.

6. A method of forming reinforced powder particles, as set forth in claim 1, wherein said step of suspending said atomized discrete droplets in an elevated temperature environment includes discharging said droplets into a heated chamber of a spray dryer.

* * * * *